US009698624B2

(12) United States Patent
Osswald

(10) Patent No.: US 9,698,624 B2
(45) Date of Patent: Jul. 4, 2017

(54) CHARGING DEVICE HAVING A POWER ELEMENT

(75) Inventor: Alexander Osswald, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 978 days.

(21) Appl. No.: 13/383,392

(22) PCT Filed: Jun. 7, 2010

(86) PCT No.: PCT/EP2010/057903
§ 371 (c)(1),
(2), (4) Date: Mar. 23, 2012

(87) PCT Pub. No.: WO2011/015392
PCT Pub. Date: Feb. 10, 2011

(65) Prior Publication Data
US 2012/0169285 A1   Jul. 5, 2012

(30) Foreign Application Priority Data
Aug. 6, 2009 (DE) .................. 10 2009 028 301

(51) Int. Cl.
*H02J 7/00* (2006.01)
*H02J 9/00* (2006.01)

(52) U.S. Cl.
CPC ............ *H02J 9/005* (2013.01); *H02J 7/00* (2013.01); *H02J 2009/007* (2013.01)

(58) Field of Classification Search
CPC . Y02E 60/12; H02J 7/14; H02J 7/0068; H02J 7/008; H02J 7/0072; H02J 7/0031; H02J 7/022; H01M 10/441; H01M 10/44
USPC ........................................ 320/112
See application file for complete search history.

(56) References Cited

U.S. PATENT DOCUMENTS

| 2001/0017533 A1* | 8/2001 | Kaite et al. .................. 320/132 |
| 2005/0068019 A1* | 3/2005 | Nakamura et al. ........... 323/355 |
| 2007/0188134 A1* | 8/2007 | Hussain et al. .............. 320/114 |
| 2008/0012524 A1* | 1/2008 | Yu .................................. 320/103 |
| 2009/0184687 A1* | 7/2009 | Schroeder et al. ........... 320/162 |
| 2009/0200982 A1* | 8/2009 | Hurtz .................... G06F 1/3203 320/103 |

FOREIGN PATENT DOCUMENTS

| DE | 10100767 | 7/2002 |
| EP | 1819027  | 8/2007 |
| EP | 2073341  | 6/2009 |

OTHER PUBLICATIONS

International Search Report, PCT International Application No. PCT/EP2010/057903, dated Apr. 11, 2011.

* cited by examiner

*Primary Examiner* — Arun Williams
(74) *Attorney, Agent, or Firm* — Norton Rose Fulbright US LLP; Gerard Messina

(57) ABSTRACT

In a charging device having a power element for producing a charge voltage for charging a battery pack from an input voltage provided by an input voltage source, the power element and the input voltage source being capable of being connected to one another in electrically conductive fashion via a separator that can be controlled by a control unit, and the separator being fashioned for the purpose of producing, in an allocated switching mode, an electrically conductive connection between the power element and the input voltage source and, in an allocated separating mode, separating this electrically conductive connection, the control unit is connected, at least for standby power supply, to an allocated energy storage device, and is fashioned for the purpose of controlling the separator during the transition from a charge operating mode to a standby operating mode of the charging device, in order to change the separator over from switching mode to separating mode.

14 Claims, 1 Drawing Sheet

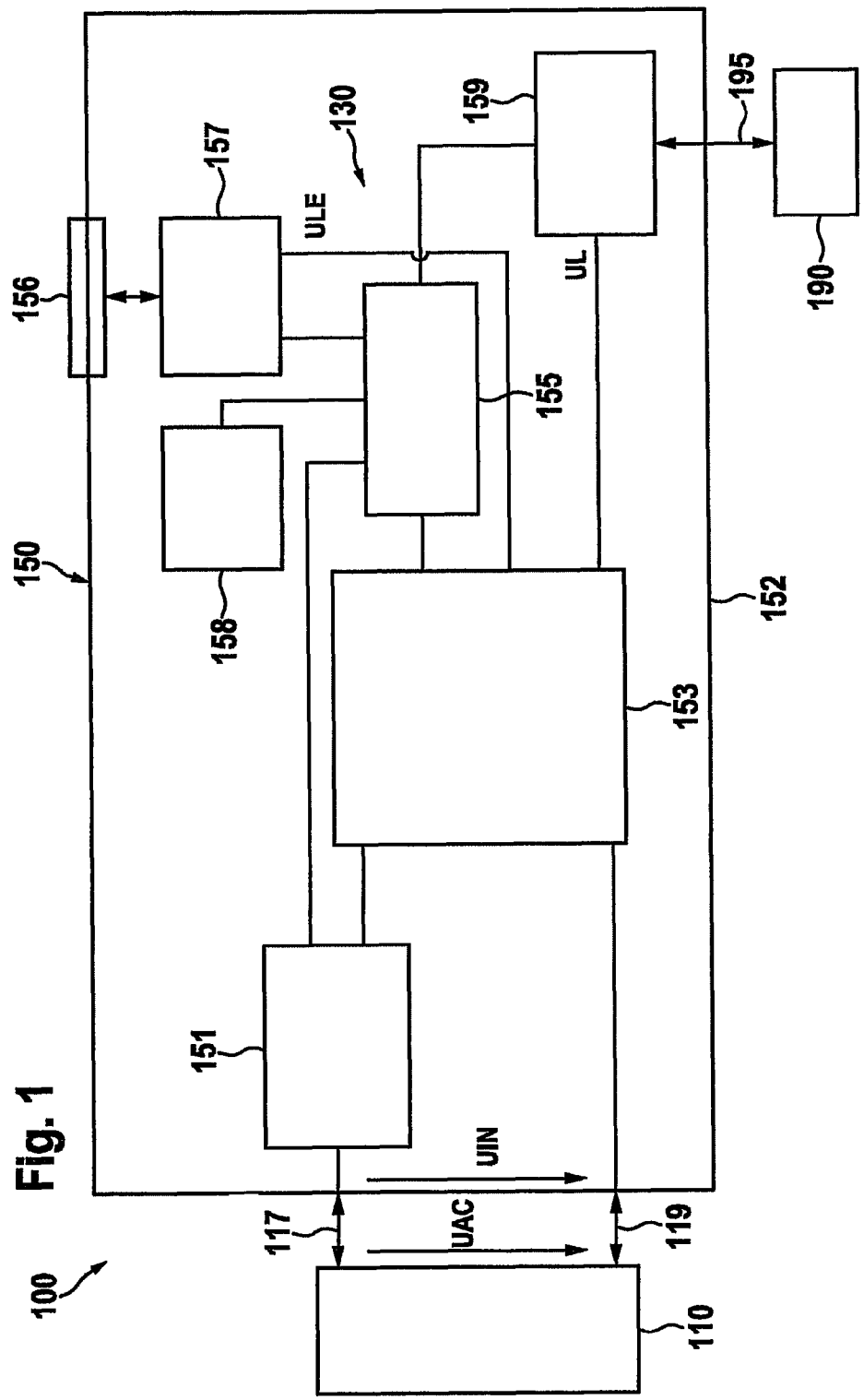

CHARGING DEVICE HAVING A POWER ELEMENT

FIELD OF THE INVENTION

The present invention relates to a charging device having a power element for producing a charge voltage for charging a battery pack from an input voltage provided by an input voltage source, the power element and the input voltage source being capable of being connected to one another in electrically conductive fashion via a separator that can be controlled by a control unit, the separator being fashioned for the purpose of producing, in an allocated switching mode, an electrically conductive connection between the power element and the input voltage source, and, in an allocated separating mode, separating this electrically conductive connection.

BACKGROUND INFORMATION

German Patent No. DE 101 00 767 A1 describes a charging device in which, during operation in an allocated readiness mode, i.e. in standby operation, the power element is separated from an input-side voltage supply network by opening a mechanical switch. When an electrically conductive connection is created between the charging device and a battery pack that is to be charged, a current or voltage detector allocated to the charging device detects the battery pack and, using its residual voltage, activates the control unit in order to bring about a closing of the mechanical switch and thus a transition of the charging device to an allocated charge operating mode in order to charge the battery pack.

A disadvantage of previous devices is that the detection of highly discharged battery packs is particularly critical and can be liable to error. In addition, an existing residual voltage of the battery pack may not be adequate for the activation of the control unit, so that a secure and reliable charging of the battery pack cannot be ensured in all cases.

SUMMARY

An object of the present invention is therefore to provide a new charging device for charging a battery pack, with which a secure and reliable charging of the battery pack can be ensured.

This problem is solved by a charging device having a power element for producing a charging voltage for charging a battery pack from an input voltage provided by an input voltage source. The power element and the input voltage source are capable of being connected to one another in electrically conductive fashion via a separator that can be controlled by a control unit. The separator is fashioned for the purpose of producing, in an allocated switching mode, an electrically conductive connection between the power element and the input voltage source, and, in an allocated separating mode, separating this electrically conductive connection. At least for standby power supplying, the control unit is connected to an allocated energy storage device, and is fashioned for the purpose of controlling the separator during the transition from charging operation to standby operation of the charging device, in order to change the separator over from switching mode to separating mode.

The present invention thus enables the provision of a charging device in which consumption of power from the input voltage source is completely prevented in standby operation.

The control unit is preferably fashioned for the purpose of controlling the separator during the transition from standby operation to charging operation of the charging device, in order to change the separator over from separating mode to switching mode.

In this way, a simple and rapid activation of the charging device during the transition into charging operation can be ensured.

The control unit is preferably fashioned for the purpose of detecting the charge operating mode and standby operating mode of the charging device, and to control the power element during charge operating mode in order to produce the charge voltage.

In this way, a secure and reliable controlling of the charging device can be achieved.

The control unit is preferably fashioned for the purpose of detecting the charge operating mode of the charging device for the case in which the battery pack is electrically conductively connected to the charging device and is to be charged.

In this way, a transition from standby operation of the charging device to charging operation can be determined easily and precisely.

According to a specific embodiment, the control unit is fashioned for the purpose of detecting a state of charge allocated to the energy storage device.

The present invention thus enables a continuous monitoring of the standby power supply of the energy storage device.

The control unit is preferably fashioned for the purpose of triggering an alarm if the state of charge falls below a specified threshold value.

In this way, an insufficient state of charge of the energy storage device can easily be indicated.

According to a specific embodiment, the energy storage device is a battery that can be introduced into the charging device via an allocated battery compartment.

The present invention thus enables an easy and rapid exchanging of the energy storage device if this device has an insufficient state of charge.

According to a specific embodiment, the energy storage device is an accumulator, the control unit being fashioned for the purpose of controlling the separator in order to change over from separating mode to switching mode if the state of charge of the accumulator falls below the specified threshold value, in order to enable a transition of the charging device from standby operation to charging operation in order to produce a charge voltage for charging the accumulator.

The present invention thus enables, in a simple and economical manner, the continuous ensuring of a sufficient state of charge of the energy storage device for standby operation of the control unit.

Preferably, a display unit controllable by the control unit is provided in order to display the state of charge and/or in order to output a visual alarm.

In this way, a visualization can be enabled of a particular state of charge of the energy storage device.

The separator preferably has a mechanical relay.

In this way, a simple and economical separator can be realized.

The separator preferably has at least one semiconductor switch.

In this way, a secure and reliable separator can be realized.

The problem described above is also solved by a control circuit for a power element for producing an output voltage from an input voltage provided by an input voltage source.

The power element and the input voltage source are capable of being connected to one another in electrically conductive fashion via a separator that is controllable by a control unit. The separator is fashioned for the purpose of producing, in an allocated switching mode, an electrically conductive connection between the power element and the input voltage source, and separating, in an allocated separating mode, this electrically conductive connection. At least for standby power supplying, the control unit is connected to an allocated energy storage device, and is fashioned for the purpose of controlling the separator during the transition from normal operation to standby operation of the control circuit, in order to change the separator over from switching mode to separating mode.

BRIEF DESCRIPTION OF THE DRAWINGS

The present invention is described in more detail below, on the basis of an exemplary embodiment shown in the FIGURE.

FIG. 1 shows a simplified schematic diagram of a system having a charging device, according to a specific embodiment.

DETAILED DESCRIPTION OF EXAMPLE EMBODIMENTS

FIG. 1 schematically shows a system 100 having a charging device 150 for charging a battery pack 190. Charging device 150 has as an example a housing 152 in which there is situated a power element 153 that produces an electrical output voltage UL from an electrical input voltage UIN. According to a specific embodiment, charging device 150 has allocated to it a control circuit 130, preferably also situated in housing 152, for controlling electrical energy supplied to power element 153.

It is to be noted that the description of the use of control circuit 130 in charging device 150 is intended only as an example, and not as limiting the present invention. Rather, control circuit 130 can for example be used in any type of power supply or power pack in which a power element is used to produce an electrical output voltage in order to operate an electrical consuming unit. For example, control circuit 130 could be used in a power pack of a portable computer in which the power pack can be switched into a standby operating mode for the case in which the computer is switched off and a battery pack allocated to the computer is charged.

According to a specific embodiment, charging device 150 is capable of being connected, for power supply, to an input voltage source 110, as is indicated by arrows 117, 119. Input voltage source 110 is fashioned as an example as an alternating voltage source, for example allocated to an alternating voltage supply network and providing an input alternating voltage UAC. However, it is also possible to operate charging device 150 from a direct voltage source, for which purpose simple input-side modifications, of the charging device 150 shown in FIG. 1 may be required. Input alternating voltage UAC is preferably converted into a direct voltage, designated input voltage UIN in FIG. 1, e.g., using a bridge rectifier provided at the input side at charging device 150. Because such a measure is familiar to those skilled in the art, for simplification the depiction of a suitable bridge rectifier has been omitted in FIG. 1.

Input voltage source 110 is connected to power element 153 and to a separator 151. Power element 153 is shown connected to an allocated control unit 155, an energy storage device 157, and a contact unit 159. Separator 151 is connected to power element 153 and to control unit 155. This control unit is connected to energy storage device 157, contact unit 159, and a display 158. Contact unit 159, energy storage device 157, separator 151, and control unit 155 form control circuit 130.

According to a specific embodiment, power element 153 is fashioned as a plate transformer or as a switch-mode power supply. However, it is to be noted that the use of such a transformer or switch-mode power supply is indicated only as an example and is not to be understood as a limitation of the present invention. Rather, for the realization of power element 153 all types of power elements may be used that are suitable for producing output voltage UL from input voltage UIN.

Contact unit 159 is, as an example, fashioned for the purpose of enabling an electrical contacting of battery pack 190 to charging device 150, as indicated by an arrow 195, in order in this way to produce an electrically conductive connection between battery pack 190 and power element 153. Contact unit 159 is shown as a charging bay or compartment, provided on housing 152 of charging device 150, for battery pack 190.

Energy storage device 157 is, as an example, fashioned at least for standby power supply to control unit 155, i.e., for supplying power to control unit 155 in standby operating mode of charging device 150. In normal, i.e., charging, operation of charging device 150, control unit 155 is preferably supplied with power via power element 153.

According to a specific embodiment, energy storage device 157 is a battery that can be introduced into charging device 150 via a battery compartment 156 provided on housing 152. Alternatively, energy storage device 157 can be an accumulator, e.g., an NiCd, NiMH, Li-ion, or other accumulator, or a supercap that can be charged by a charge voltage ULE provided by power element 153 in normal, i.e., charging, operation of charging device 150.

According to a specific embodiment, separator 151 is capable of being operated in an allocated switching mode and in an allocated separating mode. In the switching mode, separator 151 produces an electrically conductive connection between power element 153 and input voltage source 110, and in separating mode it separates this electrically conductive connection. A changeover between switching mode and separating mode takes place for example through a suitable controlling by control unit 155.

Separator 151 can as an example be realized having a mechanical relay, e.g., a contactor or an impulse relay. It is also possible to realize separator 151 with semiconductor switches or a semiconductor circuit, having for example one or more triacs, thyristors, and/or transistors. In addition, it is also possible to realize separator 151 with a mechanical relay and allocated semiconductor elements, in particular semiconductor switches. However, it is also possible to realize separator 151 with any other elements as long the above-described functionality is ensured.

Control unit 155 is as an example realized as a charge controller or charging electronics unit. This is preferably fashioned for the purpose of detecting the charging operation and the standby operation of charging device 150, and controlling power element 153 in charging operation in order to produce output voltage UL. In particular, charging electronics unit 155 is fashioned for the purpose of recognizing a battery type allocated to battery pack 190 that is to be charged, as well as recognizing an operating state of charging device 150, e.g., no-load operation, with or without connected battery pack 190 as well as with charged battery pack 190, and, as a function of a recognized battery type or operating state, to control separator 151 and/or power element 153. Here, separator 151 can for example be controlled in isolated fashion via an optical coupler and/or transformer allocated to charging electronics unit 155. Because the functioning and realization of a suitable charging electronics unit are sufficiently known to those skilled in the art, a detailed description of charging electronics unit 155 is not given here.

Furthermore, charging electronics unit 155 can be fashioned for the purpose of determining a state of charge allocated to energy storage device 155, and triggering an allocated alarm if this charge state falls below a specified threshold value. This threshold value is preferably selected such that when it is crossed the outputting of an alarm is still possible, but a sufficient standby power supply of charging electronics unit 155 can further be ensured only for a short specified span of time. A displaying of the particular state of charge, and/or an outputting of a visual alarm, can for example take place on display 158, which is controllable for this purpose by charging electronics unit 155. However, here it is to be noted that the outputting of a visual alarm is described only as an example, and not as a limitation of the present invention. Rather, other types of alarm may also be used, e.g., the outputting of an auditory alarm.

During operation of charging device 150, charging electronics unit 155 determines whether battery pack 190 is electrically conductively connected to contact unit 159, or has been placed in battery compartment 159, and is to be charged. If a corresponding charging process is to be carried out, charging electronics unit 155 initiates normal, i.e., charging, operation, in which separator 151 is operated in switching mode and the supply of power to charging electronics unit 155 takes place via power element 153.

Charging electronics unit 155 then determines for example a battery type allocated to battery pack 190 and, as a function of the determined battery type, controls power element 153 in order to produce a suitable output voltage UL that is supplied, as charge voltage UL, to contact unit 159 and thus to battery pack 190 for the charging. This voltage can for example be in a range from 10 V to 42 V. Alternatively, charging electronics unit 155 can also control power element 153 for the production of a suitable output or charge current.

In addition, for the case in which energy storage device 157 is an accumulator, charging electronics unit 155 controls power element 153 in such a way that this element produces charge voltage ULE in order to bring about a charging of the accumulator.

If no charging processes are to be carried out, or after charging operation, charging device 150 goes into readiness mode or standby operating mode. For this purpose, charging electronics unit 155 controls separator 151 so as to change it over from switching mode to separating mode. This separates the electrically conductive connection between power element 153 and input voltage source 110 so that, in standby operation, the power consumption of power element 153 is decreased to 0 W. The supply of power to charging electronics unit 155 is now ensured by energy storage device 157, charging electronics unit 155 being operated in a mode of its lowest energy requirement in which full functional capacity of charging electronics unit 155 is still brought about. This full functional capacity includes in particular the at least repeated, preferably regular, and preferably continuous determination of the state of charge of energy storage device 157.

If the state of charge of energy storage device 157 falls below an allocated threshold value, charging electronics unit 155 triggers a corresponding alarm. The alarm and/or the state of charge can be displayed on display unit 158. In addition, the state of charge can also be continuously displayed on display unit 158.

For the case in which energy storage device 157 is a battery whose state of charge falls below the allocated threshold value in charging or standby operation of charging device 150, this battery can be exchanged via battery compartment 156. For the case in which energy storage device 157 is an accumulator, this accumulator can be charged in charging operation of charging device 150, as described above. If the state of charge of this accumulator in standby operation of charging device 150 falls below the allocated threshold value, then, according to a specific embodiment, charging electronics unit 155 controls separator 151 in order to change over from separating mode to switching mode. In this way, an electrically conductive connection is produced between power element 153 and input voltage source 110, if charging device 150 is connected to input voltage source 110, so that charging device 150 goes from standby operation into normal, i.e., charging, operation, so that power element 153 produces charging voltage ULE in order to charge the accumulator. Charge voltage ULE is preferably produced only for a comparatively short time span, e.g., one to three hours, in order to ensure sufficient charging of the accumulator. However, it is to be noted that given a corresponding design of the accumulator with a comparatively large capacity and very low self-discharge, such a charging should on average be necessary only about once per year.

If, in standby operating mode, charging device 150 of charged battery pack 190 is removed from battery compartment 159, standby operating mode is continued. If battery pack 190 is then reintroduced into battery compartment 159, e.g., for recharging after having been emptied, charging electronics unit 155 recognizes battery pack 190 as described above and initiates a transition from standby operation of charging device 150 into its normal, or charging, operation, by controlling separator 151 in order to change this separator over from separating mode into switching mode. A new charging process then takes place as described above.

What is claimed is:

1. A charging device, comprising:
   a power element to produce a charge voltage for charging a battery pack from an input voltage provided by an input voltage source to an input of the power element;
   a separator, the power element and the input voltage source being capable of being connected to one another in electrically conductive fashion via the separator;
   an allocated energy storage device;
   a control unit, the separator being controllable by the control unit, wherein the control unit is connected to the allocated energy storage device, at least for standby power supply, the separator configured to produce, in an allocated switching mode, an electrically conductive connection between the power element and the input voltage source and, in an allocated separating mode, to separate the electrically conductive connection and the control unit is configured to control the separator during transition from a charge operating mode to a standby operating mode of the charging device to change the separator over from the switching mode to the separating mode, wherein in the standby operating mode a supply of power to the control unit is provided by the energy storage device; and a housing in which are situated the power element, the separator, the energy storage device, and the control unit, wherein the power element transmits power outside of the housing by transmitting power to the battery pack located outside of the housing.

2. The charging device as recited in claim 1, wherein the control unit is configured to control the separator during the transition from standby operation to charge operation of the charging device to change the separator over from the separating mode to the switching mode.

3. The charging device as recited in claim 2, wherein the control unit is configured to detect the charge operation and the standby operation of the charging device, and to control the power element in charge operation in order to produce the charge voltage.

4. The charging device as recited in claim 3, wherein the control unit is configured to detect the charge operation of the charging device for a case in which the battery pack is connected to the charging device in electrically conductive fashion and is to be charged.

5. The charging device as recited in claim 1, wherein the control unit is configured to detect a state of charge allocated to the energy storage device.

6. The charging device as recited in claim 5, wherein the control unit is configured to trigger an alarm if the state of charge falls below a specified threshold value.

7. The charging device as recited in claim 5, wherein the energy storage device is a battery that can be introduced into the charging device via an allocated battery compartment.

8. The charging device as recited in claim 5, wherein the energy storage device is an accumulator, the control unit being configured to control the separator to change over from the separating mode to the switching mode if the state of charge of the accumulator falls below the specified threshold value in order to enable a transition of the charging device from the standby operation to the charge operation in order to produce a charge voltage for charging the accumulator.

9. The charging device as recited in claim 5, wherein the control unit is configured to control a display unit to at least one of display the state of charge, and output a visual alarm.

10. The charging device as recited in claim 1, wherein the separator has a mechanical relay.

11. The charging device as recited in claim 1, wherein the separator has at least one semiconductor switch.

12. The charging device as recited in claim 1, wherein:
the control circuit is charged in the allocated switching mode by a first charge path through which the input voltage is transmitted to the control circuit via the power element, and
the control circuit is charged in the standby mode by a second charge path that is different than the first charge path and through which power from the energy storage device is supplied to the control circuit.

13. A control circuit for a power element for producing an output voltage from an input voltage provided by an input voltage source to an input of the power element, the power element and the input voltage source being capable of being connected to one another in electrically conductive fashion via a separator that is controllable by a control unit, and the separator being configured to produce, in an allocated switching mode, an electrically conductive connection between the power element and the input voltage source and, in an allocated separating mode, to separate the electrically conductive connection, wherein the control unit is connected to an allocated energy storage device of a charging device, at least for standby power supply, and is configured to control the separator during transition from a normal operating mode to a standby operating mode of the control device to change the separator over from the switching mode to the separating mode, wherein in the standby operating mode a supply of power to the control unit is provided by the energy storage device, and wherein the control circuit, the separator, the power element, and the energy storage device are housed inside a common housing of the charging device, wherein the power element transmits power outside of the housing by transmitting power to the battery pack located outside of the housing.

14. The control circuit as recited in claim 13, wherein:
the control circuit is charged in the allocated switching mode by a first charge path through which the input voltage is transmitted to the control circuit via the power element, and
the control circuit is charged in the standby mode by a second charge path that is different than the first charge path and through which power from the energy storage device is supplied to the control circuit.

* * * * *